March 29, 1955  L. E. JOHNS  2,705,028
TAPERED SHAKE CUTTING SAW CARRIAGE
Filed Nov. 25, 1953
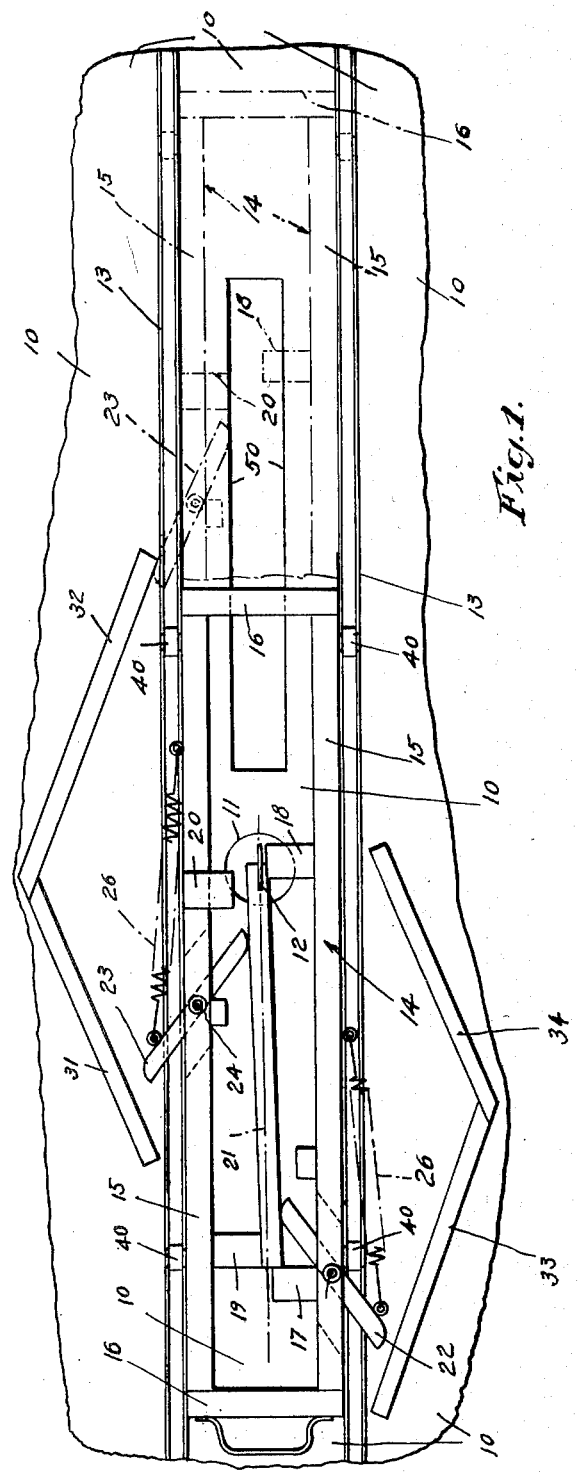
INVENTOR.
Lourence E. Johns
BY
James C. Hamilton
ATTY

2,705,028

TAPERED SHAKE CUTTING SAW CARRIAGE

Laurence Edward Johns, Ukiah, Calif.

Application November 25, 1953, Serial No. 394,409

1 Claim. (Cl. 143—8)

My present invention relates to saw carriages, and more particularly to a saw carriage for sawing the angle cut in the production of shakes used for surfacing roofs of buildings.

Shakes are produced from straight grained wood such as redwood, cypress etc. Logs of different diameters are cut off in pieces approximately twenty-four inch lengths. These twenty-four inch sections of the logs are first split into half sections and the half sections are split at right angles into pieces about one and one-quarter inch in thickness. After these one and one-quarter inch pieces are split off from the block they present two sides of grained surfaces. The pieces are now cut or sawed at an angle to produce two shakes each having one broad sawed surface and one broad grained surface. The shake is placed on the roof in the same manner as a conventional shingle but having the grained surface uppermost. This also provides a lower upper irregular corner due to the grained surface and produces the rustic effect of this type of roofing material.

In producing this shake it is impossible to saw each side at alternate angles such as in the production of conventional shingles. To do so would eliminate the desired rustic grained surface of the shake.

In the past, it has been the practice for the sawyer to feed the-one-and one-quarter inch split shake piece at an angle against the band saw for the purpose of forming two shakes from the piece. This operation is usually done by hand and is a slow process because of the care necessary to keep the hands and fingers away from the cutting teeth of the saw. Even so, many accidents occur from multiple scratches and cuts to more serious accidents where fingers are severed. This is a very dangerous operation.

My present invention obviates these dangers and speeds up the operation so that many more shakes are produced in the same length of time with comparative safety.

The principal object of my invention is an improved saw carriage for sawing shakes on an angle.

Another object is to produce a shake saw carriage in which a shake piece to be sawed may be dropped in a compartment of the carriage and become automatically positioned for cutting on the forward movement of the carriage.

Another object is to provide a shake saw carriage which not only holds the shake piece in place while being sawed but releases it when the saw has passed through it permitting it to drop through the saw table.

Other objects and novel features comprising the construction and operation of the invention will be more apparent as the description of the same progresses.

In the drawings illustrating the preferred embodiment of my invention:

Fig. 1 is a plan view, portions of the saw table have been cut away for convenience and dot-and-dash lines indicate the forward position of the carriage at the end of a cutting stroke when the sawed shakes are released, and Fig. 2 is a side elevation of the carriage and table in which the carriage is shown in full lines at the end of the cutting stroke, the near side dog release pieces are cut off to better show the side of the carriage.

Referring more in detail to the drawings comprising the preferred embodiment of my invention, 10 indicates the saw carriage table which is provided with the opening 11 through which a band-saw blade 12 operates. On the table 10 are located fixed channel irons 13. 14 indicates a carriage in which the shake piece is held and directed against the moving band-saw blade 12. The carriage 12 is composed of a rectangular frame comprising two side frames 15 and end pieces 16. This carriage frame 12 may be constructed from wood, metal or other suitable material. The carriage is open on the top and bottom. On the inner sides of the carriage side members 15 are located vertical fixed members. The member 17 acts as a back stop against which the shake member S is engaged, as shown in Fig. 1. Vertical member 18 is a positioning member against which one side of the shake member S bears. Another vertical member 19 similar to 18 is located on the opposite side of the carriage on the side 15 and is also a positioning member. The tall member 20 is a guide member when loading a shake piece in the carriage 14. The dot-and-dash line 21 indicates the line of cut of the shake piece member S when fed against the saw blade 12 when splitting the shake piece S into two pieces comprising two shakes. The dot-and-dash line 21 is parallel to the line of movement of the carriage 14.

Pivoted through the side frames 15 of the carriage 14 are spring influenced dog members 22 and 23. These dog members 22 and 23 are pivoted at 24 in the side frame portions 15 and operate through slots 25 located through the sides 15. The springs 26 are anchored to the side portions 15 of the carriage 14 on one end, the other end of the said springs are anchored to the external ends of the dogs 22 and 23 as indicated in Fig. 1.

Mounted on the table 10 are angularly disposed cam strips 31, 32, 33 and 34. When the carriage 14 is fully retracted, beyond the position shown in Fig. 1, the exposed ends of the dogs 23 and 24 are engaged against the cam strips 33 and 31 respectively and the dogs are retracted from the position shown in Fig. 1. At the same time the right end of the shake piece S is not in engagement with the saw blade 12. In this position a shake piece S is dropped into the carriage and the carriage is pushed forward on the rolls 40 operating in the channels 13. In the initial movement of the carriage the dogs are disengaged from the cam strips 31 and 33. The dogs 22 and 23 immediately press the shake piece S against the stop members 18 and 19. As the carriage progresses to the right on the table 10, the shake piece S engages the saw blade 12 firmly engaging the left-hand end of the shake piece S against the stop member 17. As the carriage proceeds to the right on the table 10 the saw blade 12 passed through the shake piece S on the dot-and-dash line 21 severing the piece into two complete and duplicate shakes.

When the shake piece S has progressed in the carriage 14 to a point beyond the saw blade 12 the dogs 22 and 23 engage the cam strips 34 and 32 respectively and releases the now split shakes.

By an inspection of Fig. 1 it will be observed that the table 10 is provided with an opening 50 on the right-hand end. When the dogs 22 and 23 are released from pressure against the shake piece S the shake piece S has already been split into two duplicate shakes and these two shakes are dropped through the opening 50 in the table 10 thus completing the sawing of the shake piece S. The carriage 14 is now retracted on the channel members 13 to the extreme rearward position and a new shake piece is loaded and the operation is repeated.

It will thus be seen that the diagonal severing of a shake piece into two complete shakes is accomplished with a minimum of effort eliminating saw risks usually encountered by the sawyer and at the same time greatly speeds up the operation.

While I have described my invention somewhat in detail yet it is to be understood that I may vary the construction and proportions of the device within wide latitude while still remaining within the spirit of the appended claim.

Having thus described my invention what I claim as new is:

An improved saw carriage for sawing split shake pieces comprising, a saw table with a vertically moving saw passing through an opening in said table, a guided carriage mounted on said table, holding means for said shake pieces in said carriage comprising pivoted dog members located in the sides of said carriage, the said dog members being pivoted outwardly from the interior of said carriage at the end of forward and rearward movements of said carriage by cam strips mounted on said table and engaging with the exterior ends of said dogs, the said dogs being held against the sides of said shake pieces by means of tension springs anchored to the exterior sides of the carriage and dog members.

References Cited in the file of this patent

UNITED STATES PATENTS

| | | |
|---|---|---|
| 798,393 | Connett | Aug. 29, 1905 |
| 1,673,084 | Loken | June 12, 1928 |
| 2,634,768 | Hight | Apr. 14, 1953 |
| 2,659,396 | Gledhill et al. | Nov. 17, 1953 |